United States Patent

Tseng et al.

[11] Patent Number: 5,552,939
[45] Date of Patent: Sep. 3, 1996

[54] MULTI-LENS CHANGING MECHANISM FOR USE IN OPTICAL SCANNERS

[75] Inventors: Kou-Lung Tseng; Kevin Yang, both of Hsinchu, Taiwan

[73] Assignee: UMAX Data Systems Inc., Hsinchu, Taiwan

[21] Appl. No.: 499,786

[22] Filed: Jul. 7, 1995

[51] Int. Cl.$^6$ ............................................. G02B 07/02
[52] U.S. Cl. ................................. 359/821; 359/822
[58] Field of Search .................................... 359/821, 672, 359/381, 421, 822, 823, 826

[56] References Cited

U.S. PATENT DOCUMENTS

| | | | |
|---|---|---|---|
| 2,216,478 | 10/1940 | Paillard | 359/821 |
| 2,377,954 | 6/1945 | Mellien | 359/821 |
| 3,600,066 | 8/1971 | Del Vecchio | 359/673 |
| 4,067,648 | 1/1978 | Spreitzer | 353/27 |
| 4,092,063 | 5/1978 | Koester | 353/71 |
| 4,162,846 | 7/1979 | Moyroud | 354/10 |
| 4,346,969 | 8/1982 | Moyroud | 354/7 |
| 4,961,087 | 10/1990 | Gandini | 355/71 |

*Primary Examiner*—Georgia Y. Epps
*Assistant Examiner*—Ricky Mack
*Attorney, Agent, or Firm*—W. Wayne Liauh

[57] ABSTRACT

A multi-lens changing mechanism is disclosed for use in optical scanners; it comprises: (a) a main mechanism having a bottom, first and second sides, and an aperture as an inlet for receiving light, each of the first and second sides having a magnetic means attached thereto; (b) a sliding lens carriage including at least two lenses, the sliding lens carriage being slidable within the main mechanism: and (c) a driving mechanism including a guide rod and a swinging arm. The guide rod is fitted at the bottom of the main mechanism, and is able to move back and forth. The swinging arm has a first end attached to the sliding lens carriage and a second end pivotally mounted to the main mechanism such that the swinging arm will swing when it is driven by the guide rod. The swinging arm of the driving mechanism is constructed such that a vertical movement of the guide rod is convened into a horizontal movement of the sliding lens carriage so as to switch between different lenses Furthermore, the sliding lens carriage has first and second sides opposite the first and second sides of the main mechanism, respectively, each of the first and second sides of the sliding lens carriage is provided with a magnetic means, which, in cooperation with the magnetic means provided on the main mechanism, causes the sliding lens carriage to be firmly but movably attached onto either of the first or second side of the main mechanism so as to effectuate a lens-changing function.

13 Claims, 8 Drawing Sheets

MULTI-LENS CHANGING MECHANISM FOR USE IN OPTICAL SCANNERS

BACKGROUND OF THE INVENTION

This invention relates to a mechanism for changing different lenses, and particularly to a mechanism which can provide an optical scanning device with different lenses for different resolution requirements. Different lenses can be switched without additional power. The aforesaid mechanism has a simple structure so as to facilitate the assembling, disassembling and maintenance thereof, and therefore its manufacturing cost will be lowered.

In conventional optical scanning devices, each was designed with a given resolution to meet the user's requirement. A scanner of high resolution is used for input of drawings or words, while a scanner of low resolution is used for input of simple papers. Theoretically, a scanner of high resolution can provide a better scanning quality, but the scanning speed thereof is slower as a result of the increment of scanning spots; therefore, a user may select a faster scanner as long as the resolution requirement is met.

In current conventional scanning devices, the lens thereof is designed for a single resolution; as a restlit, if a user wants to process different papers by means of a scanning input, at least two scanners having different resolutions must be provided, resulting in more money spent; otherwise, the user has to accept poor scanning quality or slow scanning speed. In other words, the lenses of the aforesaid conventional scanning devices would have more or less drawbacks to improve.

SUMMARY OF THE INVENTION

This invention relates to a multi-lens changing mechanism for scanners, which comprises a main mechanism, a sliding lens carriage and a driving mechanism. The power of a scanning device is used for driving a guide rod to enable the mechanism to change to a specific position desired so as to switch different lens to a position desired. The prime object of the present invention is to provide a multi-lens changing mechanism for an optical scanning device so as to furnish two different resolutions. Since the guide rod is movably mounted to the scanning device, no additional power is required upon switching the lenses, i.e., the manufacturing cost will be reduced, and the space for mounting a driving motor will also be saved. Further, the optical scanning device will have a wide range of resolution, and a smaller size.

Another object of the present invention is to provide a multi-lens changing mechanism, which comprises a swinging arm to enable the vertical movement of a guide rod to be converted into a horizontal movement of the sliding lens carriage so as to simplify the structure of the mechanism, and to facilitate the assembling disassembling and maintenance thereof, then, the manufacturing cost thereof will be reduced.

Still another object of the present invention is to provide a multi-lens changing mechanism, which has a lens-switching mechanism to lock the guide rod in place. The guide rod is provided with a braking slot; under shipping conditions, a positioning screw can be slid into the braking slot so as to prevent the guide rod from moving back and forth, i.e., the guide rod and the sliding lens carriage can be fastened in place without impact on each other or the like.

DETAILED DESCRIPTION

Figure 1:
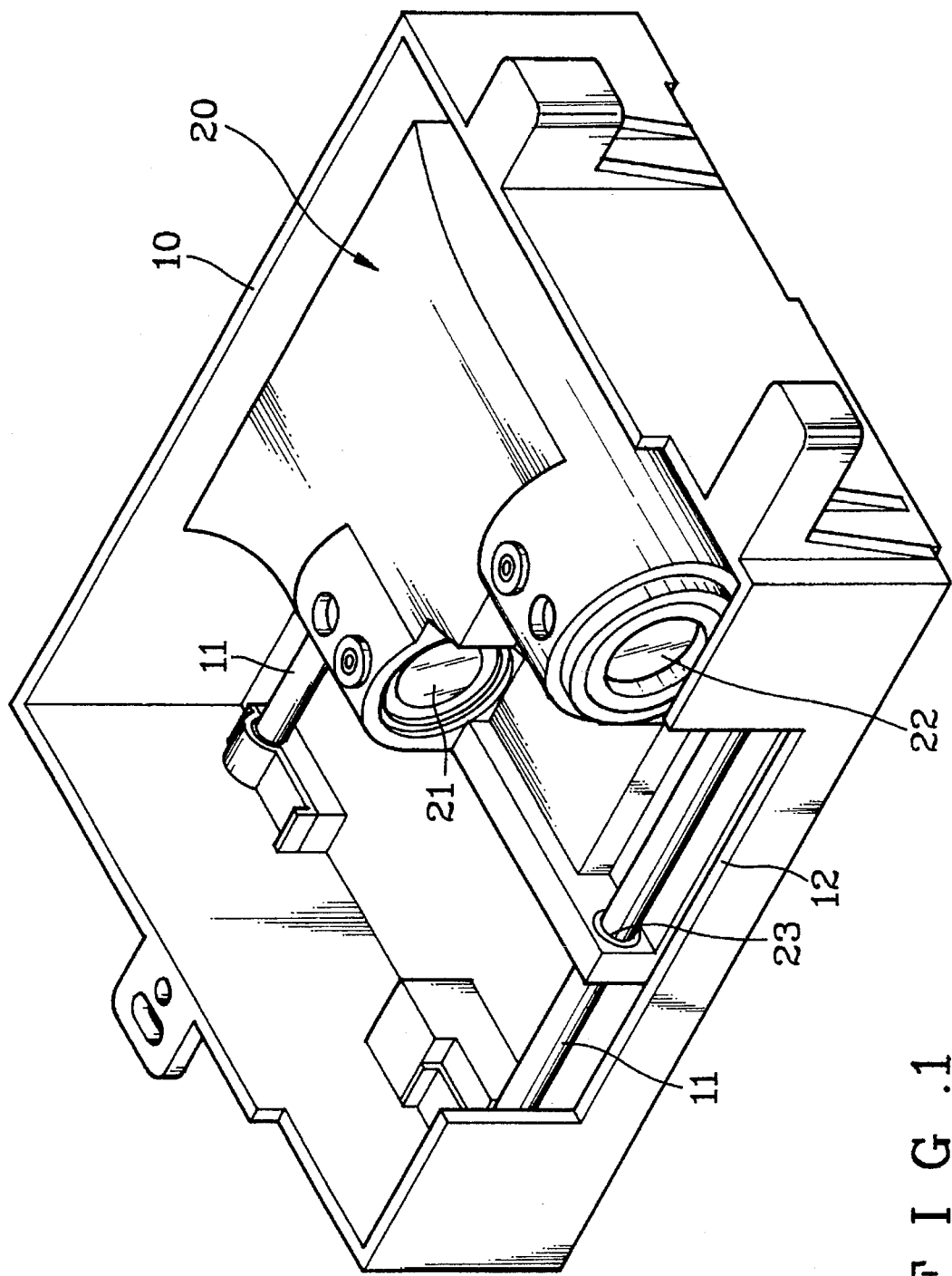
FIG. 1 is a perspective view of an embodiment according to the present invention.
Figure 2:
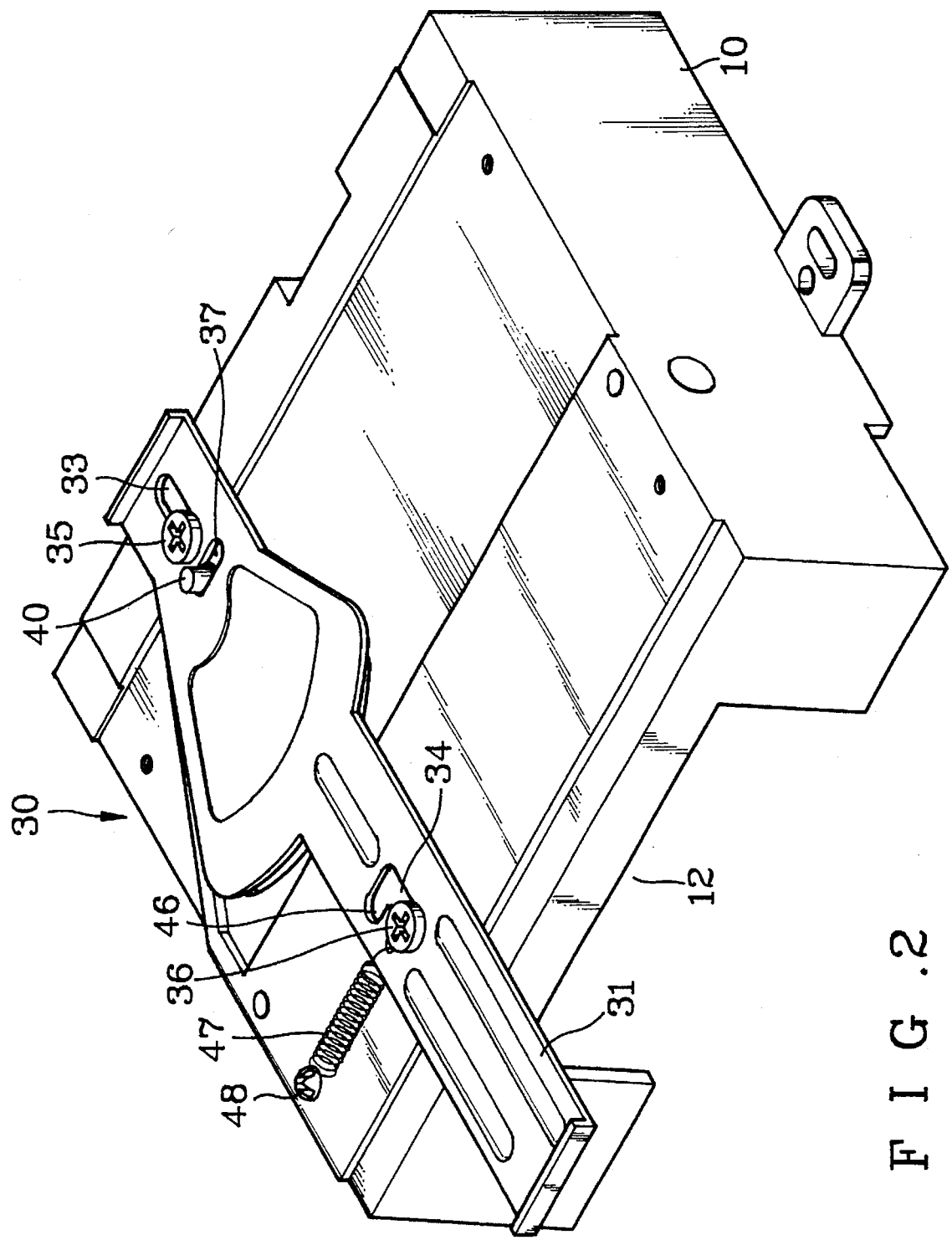
FIG. 2 is another perspective view of the present invention.

Referring to FIGS. 1 and 2, the present invention is illustrated with two different perspective views. The present invention comprises a main mechanism 10, a sliding lens carriage 20, and a driving mechanism 30. The main mechanism 10 is substantially a square box, which includes a sliding rail 11 and an aperture 12 as an inlet upon a CCD circuit receiving light. The sliding lens carriage 20 enables a first lens 21 and a second lens 22 (i.e., at least two lenses) mounted on one carriage. Both the upper and lower parts of the carriage are provided with round groove 23 for mounting the sliding rail 11. The sliding lens carriage 20 inside the main mechanism 10 can slide back and forth along the sliding rail 11 upon being driven.

Figure 3:
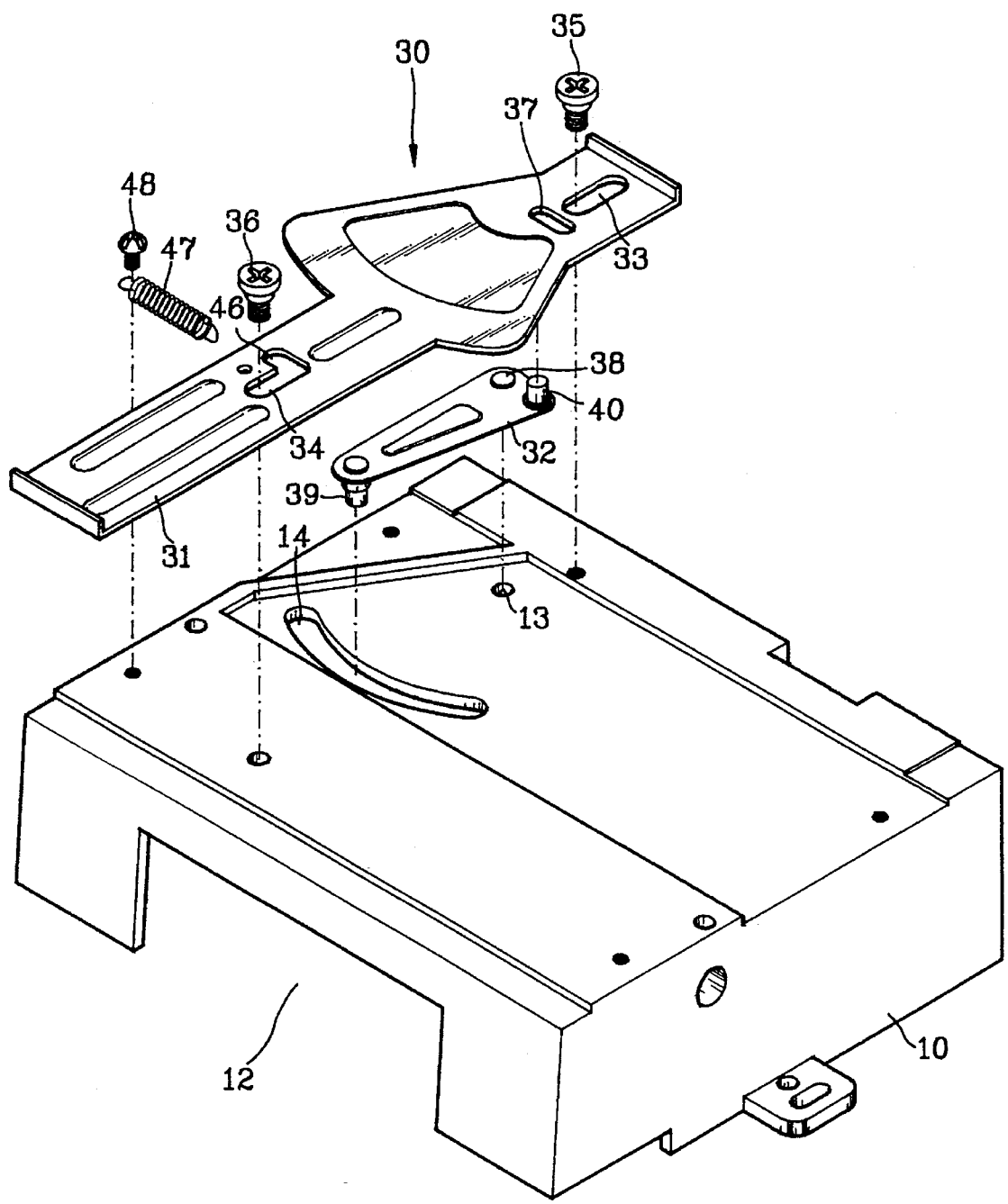
FIG. 3 is a disassembled view of the present invention.

The driving mechanism 30 is designed simply in structure (as shown in FIGS. 2 and 3), and includes a guide rod 31 and a swinging arm 32. The guide rod 31 is mounted at the bottom of the main mechanism, which includes at least, two sliding slots 33 and 34; the two sliding slots 33 and 34 are fitted with two positioning screws 35 and 36 respectively to the main mechanism 10. The guide rod 31 can slide back and forth along a line as limited with the positioning screws 35 and 36. The guide rod 31 is also provided with a sliding slot 37 perpendicular to the aforesaid two sliding slots 33 and 34.

The swinging arm 32 is mounted at the bottom of the main mechanism 10, but between the main mechanism 10 and the guide rod 31. The swinging arm 32 has a pivot 38 mounted in a pivot hole 13 on the main mechanism 10 so as to have the swinging arm 32 mounted pivotally to the main mechanism 10, in such a way the swinging arm 32 is able to swing back and forth. The other end of the swinging arm 32 is furnished with a sliding pin 39, facing down to the main mechanism 10 and being fitted in a curved sliding slot 14 so as to have the sliding pin 39 moved and guided along a curved line; the sliding pin 39 can also be limited and positioned on both ends of the curved sliding slot 14. On the opposite side of the pivot 38, there is a top pin 40 that extends towards the guide rod 31, being fitted in the sliding slot 37 of the guide rod 31.

Figure 4:
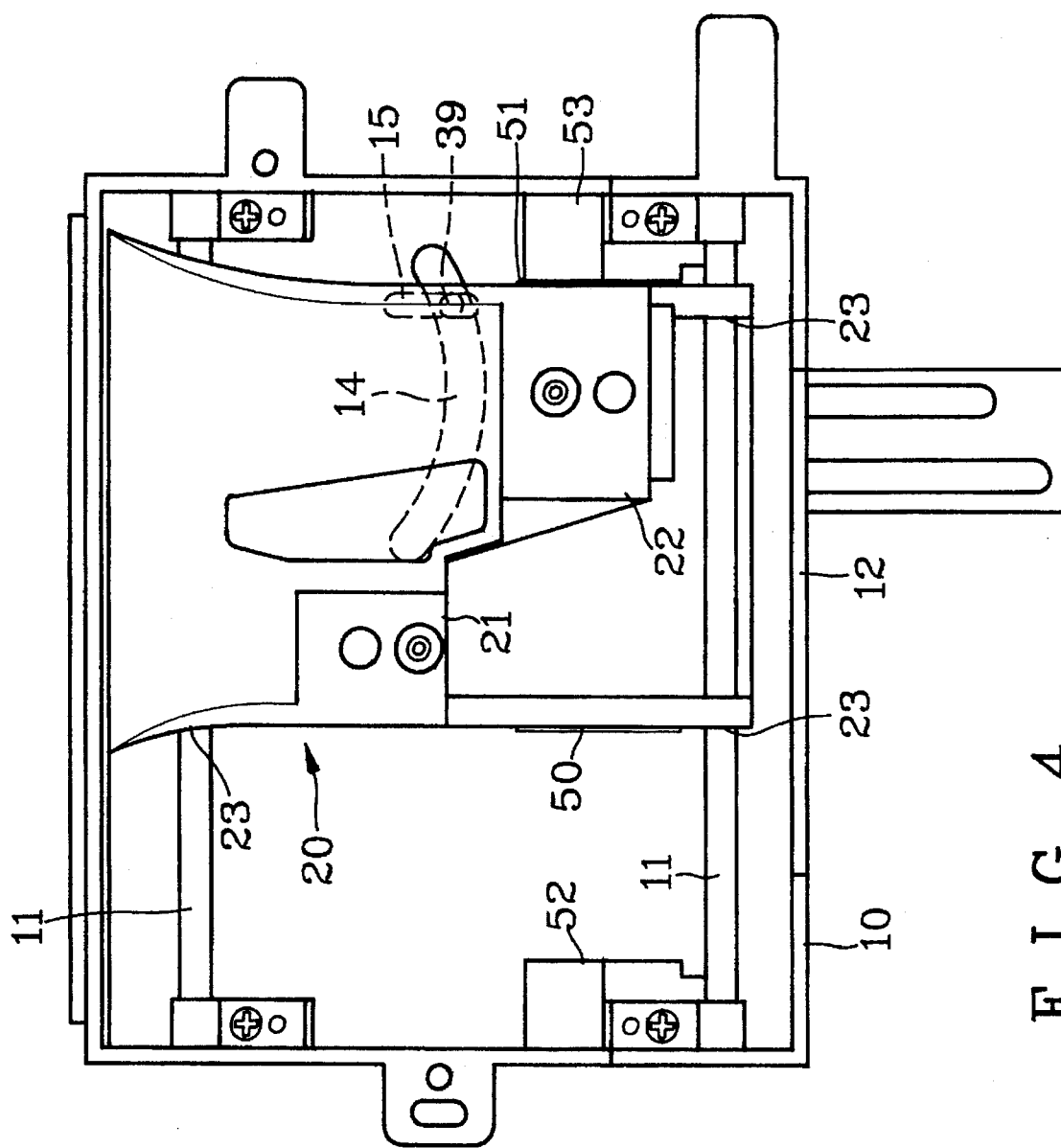
FIG. 4 illustrates the present invention being operated at a given step.
Figure 5:
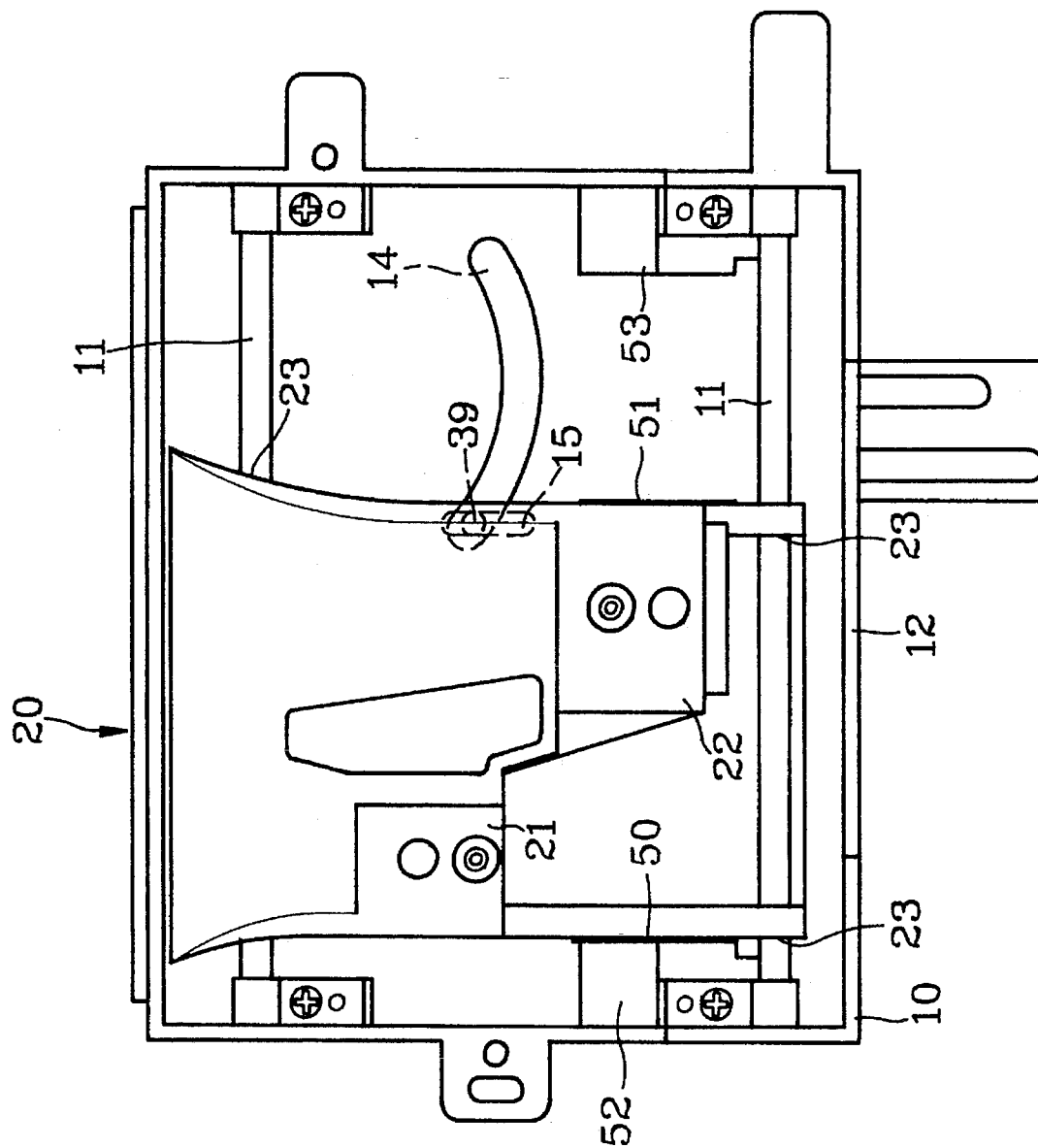
FIG. 5 illustrates the present invention being operated at another step.
Figure 6:
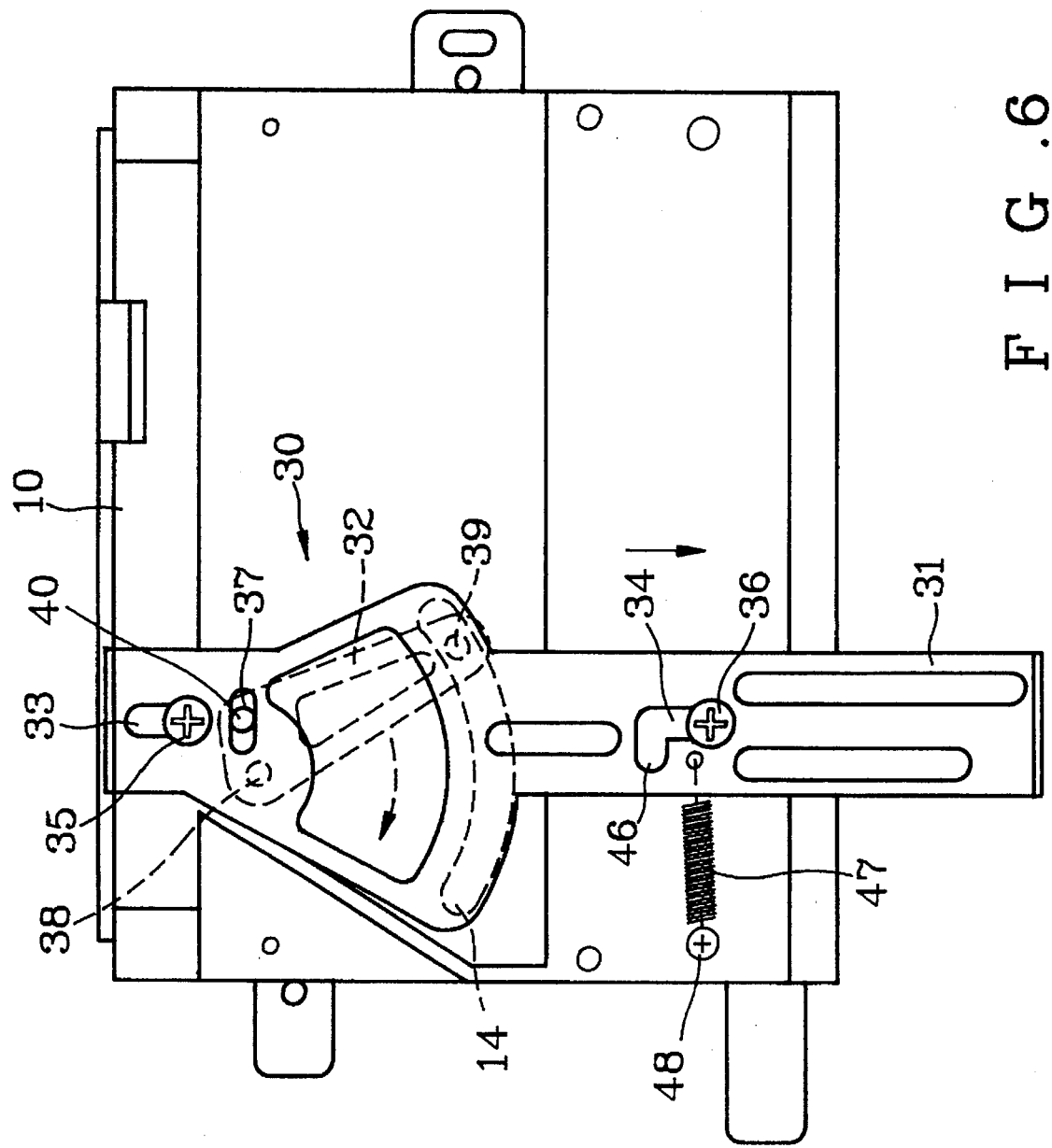
FIG. 6 illustrates the present invention being operated at still another step.

As shown in FIG. 6, when the guide rod 31 is moved up and down vertically, the sliding slot 37 of the guide rod 31 will push the top pin 40 to move counter-clockwise or clockwise around the pivot 38 as a fulcrum. Simultaneously, the swinging arm 32 pivoted on the pivot 38 will swing. Then, the sliding pin 39 on the swinging arm 32 will also be slid leftwards or rightwards in the curved sliding slot 14 at the bottom of the main mechanism 10. The other end of the sliding pin 39 is fitted in a sliding slot 15 (as shown in FIGS. 4 and 5) on the back side or the sliding lens carriage 20 in the main mechanism 10 so as to have the swinging arm 32 and the sliding lens carriage 20 connected together, in which case, the sliding pin 39 will, through the sliding slot 15, drive the sliding lens carriage 20 to move rightwards (as shown in FIG. 4) or leftwards (as shown in FIG. 5) horizontally. According to a transmission theory used in the driving mechanism 30 of the present invention, the vertical movement of the guide rod 31 under the main mechanism 10 is converted, through the swinging arm 32, into a horizontal movement of the sliding lens carriage 20 in the main mechanism 10.

Figure 7:
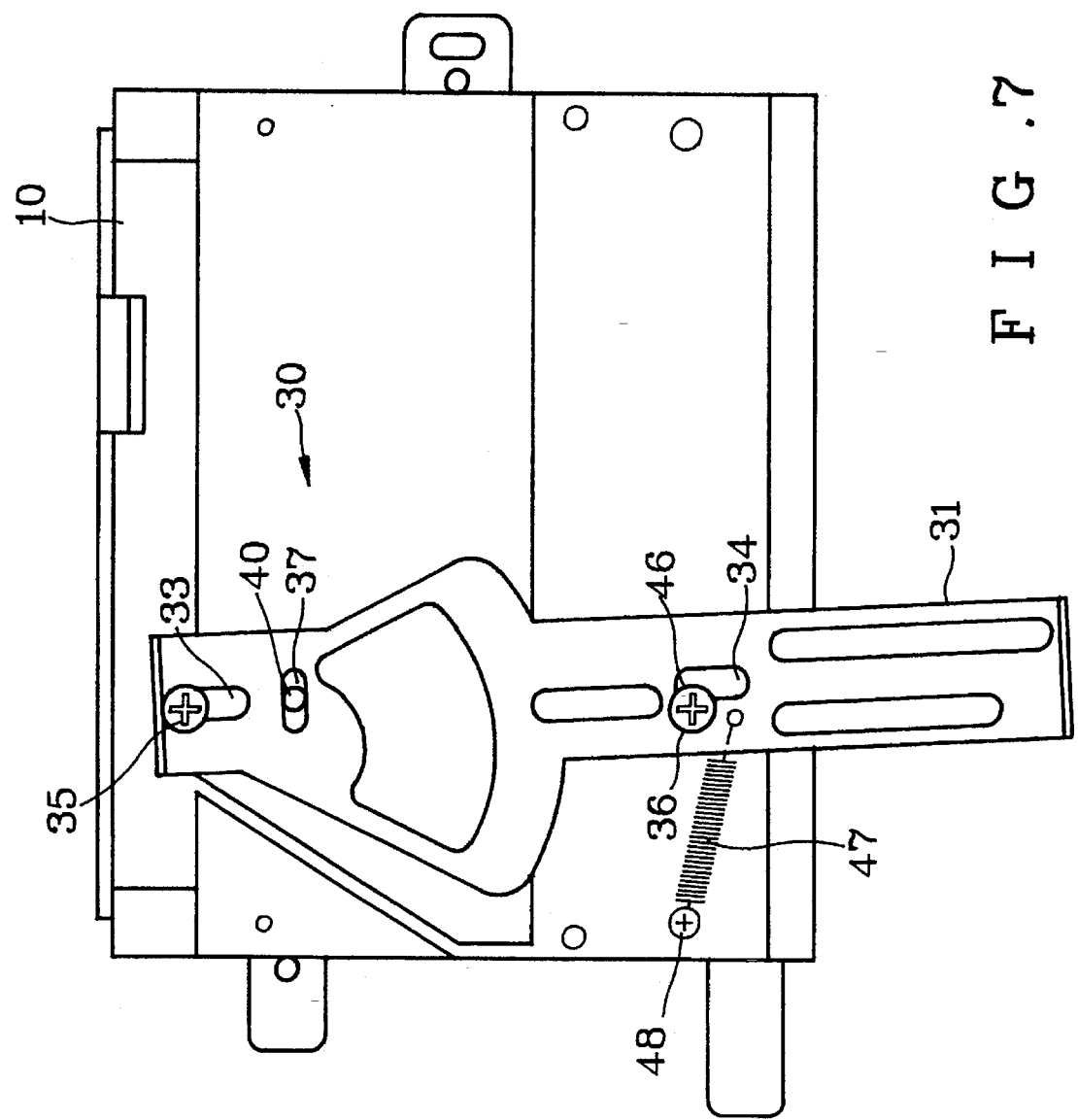
FIG. 7 illustrates the present invention being locked at a given condition.
Figure 8:
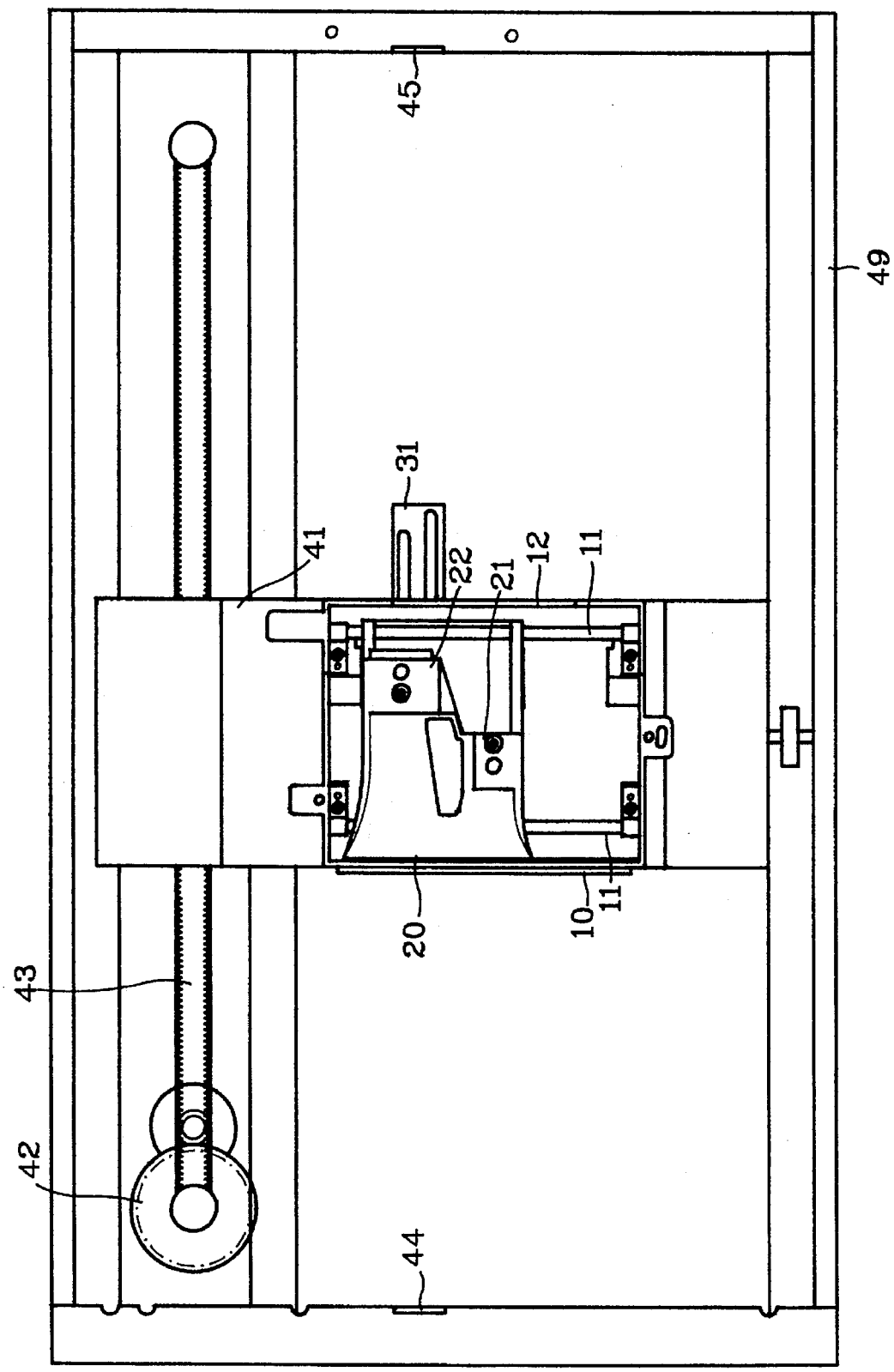
FIG. 8 illustrates the present invention being fitted in an optical scanning device.

The embodiment of the present invention can be used in an optical scanning device by mounting the embodiment on a scanning plate 41 (as shown in FIG. 8). Normally, the first lens 21 is used for providing a first resolution. When a second resolution is required, a driving motor 42 and a driving belt 43 in the optical scanning device, which is a program controlled device, will cause the present invention on the scanning plate 41 to move to the rear switching position 45 on the rear end of a frame 49. In that position, the guide rod 31 will be pushed to move forwards; by means of the swinging arm 32, the second lens 22 of the sliding lens carriage 20 in the main mechanism 10 will be moved to the working position (as shown in FIG. 5), ending the lens-changing function. When a user wants to use the first resolution, the present invention may be moved to the front switching position 44 in the front end of the frame 49; the guide rod 31, upon being pushed by the switching position, will move backwards, and then the first lens 21 will, as a result of the swinging arm 32, return to the working position (as shown in FIG. 4). According to the present invention, a simple swinging arm enables the vertical movement of the guide rod to be converted into a horizontal movement of the sliding lens carnage, i.e., the structure can be simplified to facilitate disassembling, assembling and maintenance thereof As shown in FIGS. 2 and 3, the sliding slot 34 of the guide rod 31 is added with a braking slot 46; a pulling spring 47 is mounted between one side of the guide rod 31 and a screw 48 on the main mechanism 10. Normally, the guide rod 31 will pull to cause the positioning screw 36 to stay in the sliding slot 34 so as to have the guide rod 31 move vertically. Under shipping conditions, the guide rod 31 can be pushed fightwards with a pushing mechanism (not shown) to have the positioning screw 36 slid into the braking slot 46 (as shown in FIG. 7); in which, the guide rod 31 is unable to move vertically, i.e., being locked in place so as to have the guide rod 31 and the sliding lens carriage 20 locked without moving.

Referring back to FIGS. 4 and 5, the left and right sides of the sliding lens carriage 20 are mounted with two magnets 50 and 51 respectively. The two magnets 50 and 51 are arranged in opposite positions in respect to the other two magnets 52 and 53 mounted in the lea and right sides of the main mechanism: the two pairs of opposite magnets are also arranged in opposite poles respectively; as soon as the sliding lens carriage 20 moves into a scanning position, the carriage 20 will be positioned in place by means of the attractive force of the magnets.

We claim:

1. A multi-lens changing mechanism for use in optical scanners comprising:

a main mechanism having a bottom, first and second sides, and an aperture as an inlet for receiving, light, each of said first and second sides having a magnetic means attached thereto;

a sliding lens carriage including at least two lenses, said sliding lens carriage being slidable within said main mechanism: and a driving mechanism including a guide rod and a swinging arm; wherein:

said guide rod is fitted at the bottom of said main mechanism, and is able to move back and forth;

said swinging arm has a first end attached to said sliding lens carriage and a second end pivotally mounted to said main mechanism such that said swinging arm will swing when it is driven by said guide rod;

said swinging arm of said driving mechanism is constructed such that a vertical movement of said guide rod is converted into a horizontal movement of said sliding lens carriage so as to switch between different lenses; and said sliding lens carriage has first and second sides opposite said first and second sides of said main mechanism, respectively, each of said first and second sides of said sliding lens carriage is provided with a magnetic means which, in cooperation with said magnetic means provided on said main mechanism, causes said sliding lens carriage to be firmly but movably attached onto either of said first or second side of said main mechanism so as to effectuate a lens-changing function.

2. A multi-lens changing mechanism for use in optical scanners as claimed in claim 1, wherein said main mechanism further comprises a plurality of sliding rails and said sliding lens carriage has round grooves to respectively fit on said sliding rails of said main mechanism.

3. A multi-lens changing mechanism for use in optical scanners as claimed in claim 1, wherein said main mechanism further comprises a pivot hole and said swinging arm has a pivot mounted into said pivot hole in said main mechanism.

4. A multi-lens mechanism for use in optical scanners as claimed in claim 1, wherein said main mechanism further comprises a curved sliding slot, said sliding lens carriage has a short sliding slot, and said swinging arm has a sliding pin movably fitted in said curved sliding slot of said main mechanism; further wherein said sliding pin extends inside said main mechanism to fit into said short sliding slot of sliding lens carriage so as to cause said swinging arm and said sliding lens carriage to be connected together.

5. A multi-lens changing mechanism for use in optical scanners as claimed in claim 1, wherein said sliding lens carriage has a short sliding slot, and said second end of said swinging arm has a top pin to be fined into said short sliding slot of said guide rod; further wherein said top pin is structured as to enable said swinging arm to swing when it is driven with said guide rod.

6. A multi-lens changing mechanism for use in optical scanners as claimed in claim 1, wherein said guide rod has at least two sliding slots to be mated, respectively, with corresponding positioning screws provided on said main mechanism so as to limit said guide rod to move back and forth along a straight line at the bottom of said mechanism; one of said sliding slots being added with a braking slot and one side of said guide rod having one of said positioning screws in a sliding slot such that during shipping, said guide rod is pushed down until said positioning screw is set in said braking slot.

7. A multi-lens changing mechanism for use in optical scanners comprising:

a main mechanism having an aperture as an inlet for receiving light;

a sliding lens carriage slidably disposed in said main mechanism including at least two lenses directed toward the aperture; and a driving mechanism including a guide rod and a swinging arm; wherein said guide rod is disposed at the bottom of said main mechanism and is movable longitudinally, and said swinging arm has a first end attached to said sliding lens carriage and a second end pivotally mounted to said main mechanism; said second end of said swinging arm has a spaced top pin thereof engaged with said guide rod;

wherein both lateral sides of said sliding lens carriage have carriage magnets disposed thereon respectively and said main mechanism facing each lateral side of said sliding lens carriage has a static magnet disposed thereon to attract the carriage magnet so that said sliding lens carriage can be moved transversely in said main mechanism;

whereby when said guide rod moves longitudinally, said top pin will be driven to move about the pivot, thus moving said first end of said swinging arm transversely which in turn, moves said sliding lens carriage transversely.

8. A multi-lens changing mechanism for use in optical scanners as claimed in claim 7, wherein said sliding lens carriage further has a round groove formed therein, and said main mechanism further has a sliding rail disposed therein to engage with said round groove.

9. A multi-lens changing mechanism for use in optical scanners as claimed in claim 7, wherein said swinging arm has a pivot disposed at one end, and said main mechanism has a pivot hole formed therein to engage with said pivot on said swinging arm.

10. A multi-lens changing mechanism for use in optical scanners as claimed in claim 7, wherein said swinging arm further has a sliding pin disposed thereon, said main mechanism further has a curved sliding slot formed therein and said sliding lens carriage further has a short sliding slot formed therein: whereby said sliding pin is engagable with said curved sliding slot in said main mechanism and said short sliding slot in said sliding lens carriage.

11. A multi-lens changing mechanism for use in optical scanners as claimed in claim 7, wherein said guide rod further has a first sliding slot formed therein to engage with said top pin on said swinging arm, whereby the movement of said guide rod will drive said swinging arm to swing.

12. A multi-lens changing mechanism for use in optical scanners as claimed in claim 7, wherein said guide rod has at least two other sliding slots formed therein, each other sliding slot engaging with a positioning screw for limiting the movement range of said guide rod.

13. A multi-lens charaging mechanism for use in optical scanners as claimed in claim 7, wherein one said other sliding slot further having a braking slot formed therein to engage with a said positioning screw to prevent said guide rod from moving.

* * * * *